US011076019B2

(12) United States Patent
Cai et al.

(10) Patent No.: US 11,076,019 B2
(45) Date of Patent: Jul. 27, 2021

(54) SCHEDULING SERVICES ON A PLATFORM INCLUDING CONFIGURABLE RESOURCES

(71) Applicant: F5 Networks, Inc., Seattle, WA (US)

(72) Inventors: Hao Cai, Sammamish, WA (US); William Ross Baumann, Seattle, WA (US); Timothy S. Michels, Greenacres, WA (US); Lars Pierson Friend, Seattle, WA (US)

(73) Assignee: F5 NETWORKS, INC., Seattle, WA (US)

( * ) Notice: Subject to any disclaimer, the term of this patent is extended or adjusted under 35 U.S.C. 154(b) by 0 days.

(21) Appl. No.: 16/684,642

(22) Filed: Nov. 15, 2019

(65) Prior Publication Data

US 2021/0152659 A1  May 20, 2021

(51) Int. Cl.
*H04L 29/08* (2006.01)
*G06F 9/48* (2006.01)
*G06F 9/50* (2006.01)
*H04L 12/24* (2006.01)
*H04L 29/06* (2006.01)

(52) U.S. Cl.
CPC .......... *H04L 67/327* (2013.01); *G06F 9/4881* (2013.01); *G06F 9/5044* (2013.01); *H04L 41/0816* (2013.01); *H04L 67/42* (2013.01)

(58) Field of Classification Search
CPC ... H04L 67/327; H04L 41/0816; H04L 67/42; G06F 9/4881; G06F 9/5044
See application file for complete search history.

(56) References Cited

U.S. PATENT DOCUMENTS

| 2011/0214157 | A1  | 9/2011  | Korsuneky |
| 2016/0241435 | A1  | 8/2016  | Iordache |
| 2016/0266929 | A1* | 9/2016  | Lu .......................... G06F 9/5027 |
| 2016/0308718 | A1  | 10/2016 | Lanka |

(Continued)

OTHER PUBLICATIONS

F5 Networks Inc., "VIPRION® Systems: Configuration", Manual, Sep. 28, 2012, 36 pages, Version 11.2.1, F5 Networks, Inc., Retrieved from the Internet:<https://support.f5.com/kb/en-us/products/big-ip_ltm/manuals/product/viprion-configuration-11-2-1.html>.

(Continued)

*Primary Examiner* — Arvin Eskandarnia
*Assistant Examiner* — Chhian (Amy) Ling
(74) *Attorney, Agent, or Firm* — Troutman Pepper Hamilton Sanders LLP (Rochester)

(57) ABSTRACT

Technology related to scheduling services on a platform including configurable computing resources is disclosed. In one example, a method includes scheduling a first service to execute on a computing node based on an availability of general-purpose computing resources at the computing node. The computing node can be selected from a plurality of computing nodes. Network traffic transiting the computing node can be analyzed during the execution of the first service to determine a hardware accelerator of the computing node is capable of assisting the execution of the first service. The hardware accelerator can be used to assist with the execution of the first service. A second service can be scheduled on the computing node based on the availability of the general-purpose computing resources and the usage of the hardware accelerator on the computing node.

20 Claims, 6 Drawing Sheets

(56) References Cited

U.S. PATENT DOCUMENTS

| | | | |
|---|---|---|---|
| 2016/0308719 A1 | 10/2016 | Putnam | |
| 2016/0380819 A1 | 12/2016 | Burger | |
| 2017/0177396 A1* | 6/2017 | Palermo | H04L 49/70 |
| 2017/0214677 A1* | 7/2017 | Cai | H04L 67/1097 |
| 2017/0286142 A1 | 10/2017 | Palermo et al. | |
| 2018/0159721 A1* | 6/2018 | Delcheva | H04L 67/34 |
| 2019/0004871 A1 | 6/2019 | Sukhomlinov et al. | |
| 2019/0324856 A1 | 10/2019 | Zhao et al. | |
| 2020/0257968 A1* | 8/2020 | Mitra | G06F 9/4881 |

OTHER PUBLICATIONS

F5 Networks Inc., "vCMP® for VIPRION® Systems: Administration", Manual, Jul. 6, 2015, 94 pages, Version 11.6, F5 Networks, Inc., Retrieved from the Internet:<https://support.f5.com/kb/en-us/products/big-ip_ltm/manuals/product/vcmp-administration-viprion-11-6-0.html>.

F5 Networks Inc., "BIG-IP® Global Traffic Manager™: Concepts", Manual, Jan. 27, 2014, 62 pages, Version 11.5, F5 Networks, Inc., Retrieved from the Internet:<https://support.f5.com/kb/en-us/products/big-ip_gtm/manuals/product/gtm-concepts-11-5-0.html>.

F5 Networks Inc., "F5 BIG-IP TMOS: Operations Guide", Manual, Apr. 2018, 229 pages, F5 Networks, Inc., Retrieved from the Internet:<https://support.f5.com/kb/en-us/products/big-ip_ltm/manuals/product/f5-tmos-operations-guide.html>.

F5 Networks Inc., "Software-Defined Hardware: Enabling Performance and Agility with the BIG-IP iSeries Architecture", Nov. 11, 2016, 8 pages, F5 Networks, Inc., Retrieved from the Internet:<https://f5.com/Portals/1/Cache/Pdfs/2421/software-defined-hardware-enabling-performance-and--agility-with-the-big-ip-iseries-architecture.pdf>.

Xilinx, FPGA as a Service, available at: https://github.com/Xilinx/FPGA_as_a_Service/tree/master/k8s-fpga-device-plugin/trunk, accessed Sep. 30, 2019 (4 pages).

Kubernetes, Device Plugins, available at: https://kubernetes.io/docs/concepts/extend-kubernetes/compute-storage-net/device-plugins/, accessed Sep. 30, 2019 (7 pages).

Kubernetes, Schedule GPUs, available at: https://kubernetes.io/docs/tasks/manage-gpus/scheduling-gpus/, accessed Sep. 30, 2019 (7 pages).

Branscombe, M., FPGAs and the New Era of Cloud-based 'Hardware Microservices', Jun. 8, 2017, available at https://thenewstack.io/developers-fpgas-cloud/ (17 pages).

Scionti Alberto et al, "OPERA: A Low Power Approach to the Next Generation Cloud Infrastructures", 2016 Euromicro Conference on Digital System Design (DSD), IEEE, Aug. 31, 2016 (Aug. 31, 2016), pp. 326-333.

European Search Report for corresponding European Patent Application No. 20199197.3, dated Feb. 25, 2021.

EP Search Report for corresponding EP Application No. 20199197.3, dated Feb. 11, 2021, pp. 1-9.

Scionti, A., et al., "OPERA: A Low Power Approach to the Next Generation Cloud Infrastructures", 2016 Euromicro Conference on Digital System Design (DSD), IEEE, Aug. 13, 2016, pp. 326-333, XP032986791.

* cited by examiner

SCHEDULING SERVICES ON A PLATFORM INCLUDING CONFIGURABLE RESOURCES

FIELD

This technology generally relates to network traffic management, and more specifically to scheduling services on a platform including configurable computing resources.

BACKGROUND

A software application can be distributed or partitioned across different computing devices. For example, a client-server architecture can partition tasks between a client device (such as a laptop or mobile device) and one or more application server computers connected by an interconnection network (such as the Internet) and managed by a provider of computing service(s) and/or computing resource(s). The application server computer(s) can execute software applications to provide virtual resources, software services, and/or content to the client devices. For example, client devices can initiate communication sessions with the application server computers by sending requests over the interconnection network to the application server computers, and the servers can respond to the requests. Additionally or alternatively, the application server computers can push information (without an initiating request) to the client devices over the interconnection network. As the number of client devices seeking access to the application server computers increases, intermediary computing devices, such as network traffic management computing device(s), can be added between the client devices and the application server computers. Network traffic management computing device(s) can perform security, processing, and/or routing functions of the client-server architecture, such as encrypting and/or decrypting traffic between the client and the application server. For example, the network traffic management computing device can potentially increase the scalability, availability, security, and/or performance of the client-server architecture. However, as the complexity of applications increases and the number of interconnected devices increases, there can be many challenges in implementing a high performance, highly available, and secure client-server architecture including an intermediary computing device.

BRIEF SUMMARY

Generally, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One example includes a method implemented in cooperation with a network traffic management system including one or more network traffic management modules, networking modules, or server modules, the method including: scheduling a first service to execute on a computing node based on an availability of general-purpose computing resources at the computing node. The computing node is selected from a plurality of computing nodes. The method also includes, analyzing network traffic transiting the computing node during the execution of the first service to determine a hardware accelerator of the computing node is capable of assisting the execution of the first service. The method also includes using the hardware accelerator to assist with the execution of the first service. The method also includes scheduling a second service on the computing node based on the availability of the general-purpose computing resources and the usage of the hardware accelerator on the computing node.

Other embodiments incorporating this example include corresponding computer systems, apparatus, and computer programs recorded on one or more non-transitory computer readable media (e.g., computer storage devices), each configured to perform the actions of the methods. An example computer system includes one or more network traffic management modules, networking modules, or server modules, memory comprising programmed instructions stored thereon, and one or more processors configured to be capable of executing the stored programmed instructions to perform the actions of the methods. An example non-transitory computer readable medium having stored thereon instructions for scheduling services on a platform including configurable computing resources, the instructions comprising executable code that, when executed by one or more processors, causes the processors to perform the actions of the methods. An example network traffic management apparatus includes memory comprising programmed instructions stored thereon and one or more processors configured to be capable of executing the stored programmed instructions to perform the actions of the methods.

DETAILED DESCRIPTION

Overview

Figure 1:
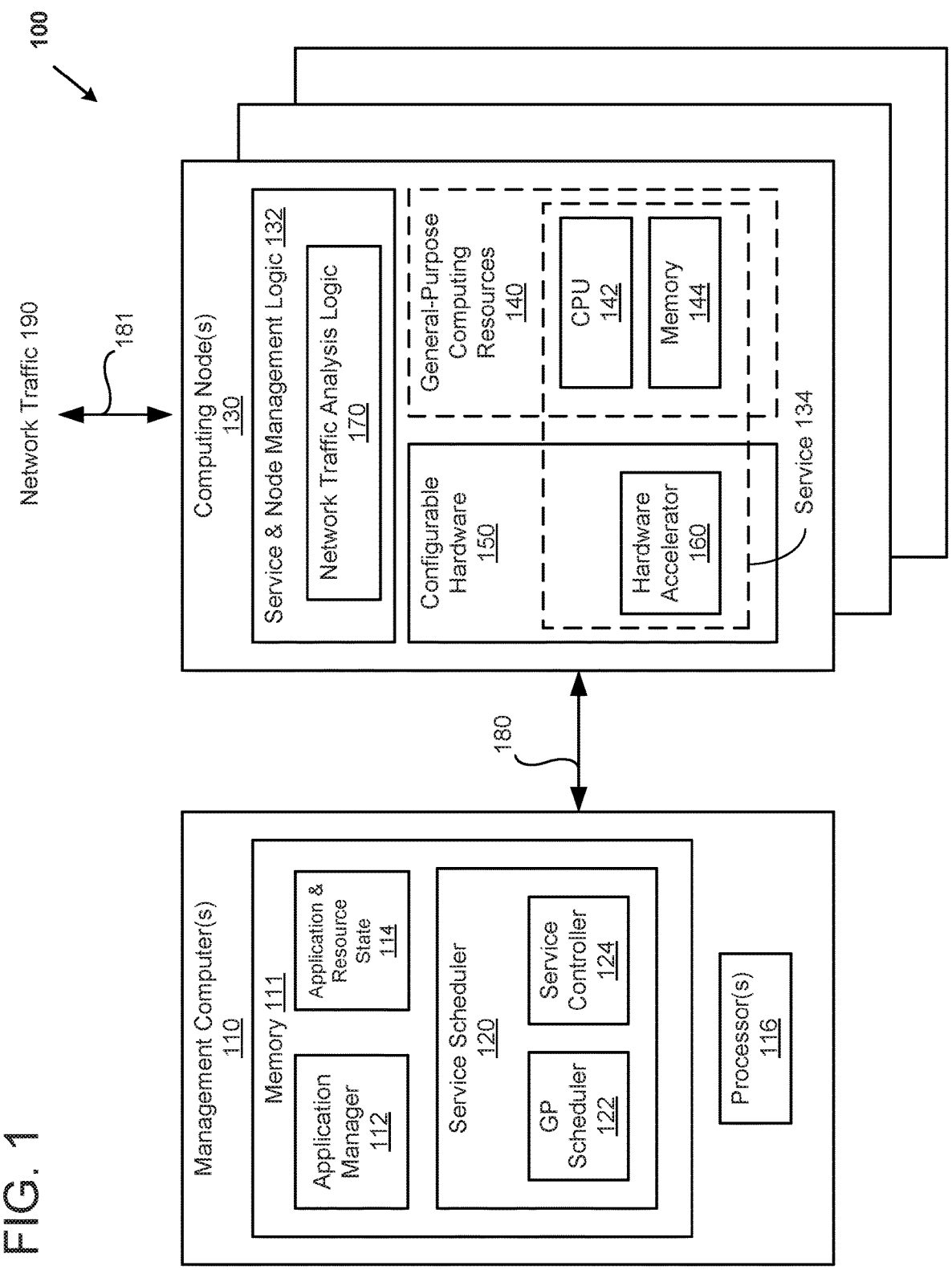
FIG. 1 is a block diagram of an architecture including configurable computing resources, the architecture capable of executing a workload composed of one or more services.

An intermediary server computer can perform various proxy and other services, such as load balancing, rate monitoring, caching, encryption/decryption, session management (including key generation), address translation, and/or access control, for example. For example, an intermediary server computer can act as a proxy for an application server. A proxy is an agent that is situated in a path of communication between a client and a server (e.g., an application server) that can intercept communications (e.g., network packets, frames, datagrams, and messages) between the client and the server. Load balancing can include distributing or disaggregating workloads from many clients across different server computers. Additionally, functions performed by the application server computer can be offloaded from the application server computer to the intermediary server computer.

The services (also referred to as workloads or applications) executed by the intermediary server computer and/or the application server computer can be performed using one or more microservices. A microservice is executable software code of bounded scope that can be independently deployed and supports interoperability with other microservices. Microservices generally use lightweight protocols to communicate over a network and/or within a microservice platform or framework. A given service can be composed of one or more microservices that interoperate to perform the functionality of the service. For example, a group of microservices can be used to perform a service, such as processing a uniquely identifiable slice of network traffic. Different services can process different slices of network traffic. For example, different slices of network traffic can be handled differently, such as by using different disaggregation (DAG) algorithms, communication protocols, quality of service (QoS) and rate limiting, and denial of service (DOS) protection. The different slices of traffic can be identified using different attributes and/or fields within one or more layers of the network packets.

The layers within a network packet can be described using the Open Systems Interconnection (OSI) model. The OSI model is one example of how functions of a communication system can be partitioned into abstraction layers. In particular, the OSI model partitions a communication system into seven layers. A particular layer provides a communication path with the layers adjacent (e.g., a layer above and a layer below) to the particular layer. The lowest layer is the physical layer (also referred to as layer 1 or L1) which defines the electrical and physical specifications for communication over a physical transmission medium. Specifically, the physical layer can define voltage levels, signal timing, transmission media (e.g., electrical cables, fiber-optic cables, radio frequencies), and so forth. The physical layer can provide a communication path with the data link layer or link layer (also referred to as layer 2 or L2). The link layer defines the protocols for transferring data between two nodes. Additionally, the link layer can define protocols for establishing and terminating connections between nodes, managing flow control, and detecting and/or correcting errors occurring on the physical layer. Ethernet is an example of a link layer protocol. The link layer can provide a communication path with the network layer (also referred to as layer 3 or L3). Examples of network layer protocols are Internet Protocol (IP) (including IPv4 and IPv6), ICMP, and Address Resolution Protocol (ARP). Other layers of the OSI model include the transport layer (also referred to as layer 4 or L4), the session layer (also referred to as layer 5 or L5), the presentation layer (also referred to as layer 6 or L6), and the application layer (also referred to as layer 7 or L7). It should be noted that a network packet (or simply a packet) generally includes a header used to address the packet to another entity (e.g., another service, a remote node, or another agent) at the layer of the packet and a payload having a discrete quantity of information. A packet addressing an agent at one layer can be encapsulated within a payload of a packet at a lower layer as the original packet transits the communication layers. A packet of the link layer can also be referred to as a frame. The OSI model is a reference and some networking protocols may not strictly adhere to the seven layers of the OSI model. For example, in some embodiments, the functions of the link layer and the physical layer may be blended into a single link layer. The combination of protocols used at the different layers of the OSI model can be referred to as a protocol stack. For example, one particular protocol stack may include an IP layer and an Ethernet layer.

The slices of network traffic can be identified using one or more packet fields from one or more of the layers 2-7. Specifically, the services can be identified using one or more of: physical ports and/or combinations, such as L2 transparency and L2 wire service for port forwarding; L2 VLAN parameters; media access control (MAC) addresses; L3 IP addresses; and/or L4 port information. A service or microservice can parse the network packets to identify the slice of network traffic associated with the network packet. Once identified, the network packet or information from the network packet can be communicated to another service or microservice for additional processing. The different microservices can execute and communicate in a microservice framework.

A microservice framework is a software management system that can be used to manage software applications (e.g., services) executing on a cluster of computing nodes. An example microservice framework is Kubernetes. The framework can provide an infrastructure that decouples the application from the physical hardware that is executing the application. By decoupling the application from the hardware, the application can potentially be more portable across different hardware and operating systems. The framework can include application control functions (also referred to as a control plane or management functions) and application execution functions (also referred to as a data plane). The control functions can enable an application to begin operation, distribute its workload, discover other services and/or applications, discover resources of the framework (such as storage, networking, and messaging), and monitor resource utilization and availability. The execution functions can enable the application to execute on the cluster of nodes, communicate with other applications, and utilize resources of the computing nodes. The microservice framework can communicate with one or more operating systems of the cluster of nodes and/or with the hardware of the nodes.

A microservice framework can enable multiple users, organizations, and/or applications to share computing and networking resources on a cluster of computing nodes. Each user, organization, and/or application can be referred to as a tenant. The microservice framework can isolate the different tenants from each other to provide a secure, available, and performant computing system. Specifically, the microservice framework can allocate a set of resources of the cluster for the exclusive use of a tenant. The exclusive use can be enforced using logical and/or physical constraints. For example, a portion of physical memory or a CPU can be allocated for the exclusive use of a tenant. As another example, a time-slice of CPU cycles can be allocated for the exclusive use of a tenant.

Generally, microservice frameworks are implemented to provide a platform for executing tenant workloads on a cluster of general-purpose computers that include general-purpose computing resources, such as a central processing unit (CPU) and memory. The microservice framework can schedule workloads to the computing nodes based on estimated requirements of the workload and available computing resources. For example, a tenant workload can include multiple microservices, where each microservice performs a sub-task of the workload and interoperates with the other microservices to perform the operations of the workload. The microservices of the workload can be deployed and scaled based on the type of microservice, estimated resource requirements, and real-time load monitoring of the computing nodes. Scheduling is assigning a given task (e.g., a microservice) to a particular resource (e.g., a computing node) so that the task can be completed. A scheduler is hardware and/or A software performs scheduling. For example, the scheduler can be used to schedule the sub-tasks (e.g., the microservices) of a given workload and/or of multiple workloads for execution on a computing cluster. The workloads can be efficiently executed, and the computing resources can be used efficiently, when the estimated requirements of the workload are well matched with the general-purpose computing resources. However, schedulers are generally optimized for auto-scaling of multiple identical services executing on a relatively large set of computing nodes (e.g., a cloud-based computing infrastructure). The schedulers make a static decision to allocate a service to a particular computing node when the service is deployed. Additionally, the schedulers may not account for real-time processing constraints of the workloads. Accordingly, the scheduler may do a poor job of allocating services to computing nodes for certain types of workloads, such as processing network traffic. For example, the network traffic patterns can change over time and so the computing nodes can become over- or under-utilized. Additionally, it may be difficult to estimate the resources for a given workload when it is deployed because the amount of traffic it services can change and network conditions (such as a DOS attack) may change the amount of processing to be performed. In other words, some workloads may be dynamic and may use different amounts of computing resources during the execution of the workload. Over-utilized computing nodes can potentially cause network packets to be dropped causing the service to perform poorly or be less available. Rescheduling a service to a different computing node can cause a temporary service outage. Under-utilized computing nodes can keep resources from being applied to a productive use and can potentially reduce the overall performance of the cluster.

As disclosed herein, a hardware and software platform can potentially execute dynamic workloads (such as workloads for processing network traffic) more efficiently than a general-purpose microservice framework executing on a cluster of general-purpose computers. For example, the platform can include a cluster of computing nodes that include both general-purpose and dynamically configurable computing resources. The dynamically configurable computing resources can include programmable hardware that is programmed using firmware and/or configuration data to control how the hardware functions. The dynamically configurable computing resources can be programmed and/or reprogrammed during operation of the computing node to customize the computing resources of the computing node to potentially increase a performance of the services executing on the computing node. For example, the dynamically configurable computing resource(s) of a given computing node can be configured to function as a hardware accelerator(s) for the services executing on the computing node.

The platform can include a microservice framework and a scheduler that schedules microservices on the computing nodes. Specifically, the scheduler can distinguish between and account for different tenants, the different microservices, and the network traffic associated therewith. The scheduler can account for the availability and/or usage of both the general-purpose and the dynamically configurable computing resources. For example, microservices can initially be scheduled on the computing nodes based on the availability of general-purpose computing resources. The microservices executing on the computing nodes can be monitored to identify hardware accelerator(s) that can potentially assist with the execution of an executing microservice. The dynamically configurable computing resources of the computing node can be programmed to implement the identified hardware accelerator(s). When the identified hardware accelerator(s) is programmed, the scheduler can account for the accelerator being present on the computing node, and later microservices can be scheduled based on the availability of the general-purpose computing resources and the usage of the hardware accelerator on the computing node. For example, each type of microservice can have an affinity or aversion to computing nodes using various types of hardware accelerators. If the hardware accelerator becomes under-utilized, such as when conditions or patterns of the network traffic change, the dynamically configurable computing resources can be reprogrammed to power down or accelerate different functions.

In one example, a method can include scheduling general-purpose resources and scheduling services based on general-purpose resources, configurable resources, and/or hardware accelerators that are available on a cluster of computing nodes. The usage and/or implementation of the configurable resources, and/or the hardware accelerators can be determined globally by the scheduler and/or locally at the computing node. The availability of the configurable resources and hardware accelerator capabilities can be published for access by the scheduler. Each computing node can analyze an amount and patterns of network traffic that are influenced based on a combination of service(s) deployed at the computing node. The computing node can select one or more hardware accelerator(s) that can be dynamically reconfigured on the applicable node to potentially improve an overall performance of the computing node. The computing node can dynamically reconfigure the configurable resources of the node with the selected accelerator. The application service executing on the computing node can seamlessly transition from using general-purpose resources to the accelerator for the accelerated capabilities. The new node capabilities (e.g., the hardware accelerator) can be published for new service scheduling and continued analysis and monitoring of the traffic and application behavior. In this manner, the computing nodes can be continually updated in pursuit of the optimal combination of hardware accelerators to assist the different services executing on the computing nodes.

Example Architectures of Platforms Including Configurable Logic

FIG. 1 is a block diagram of an architecture 100 including configurable computing resources (e.g., configurable hardware 150). The architecture 100 is capable of executing a workload composed of one or more services (e.g., service 134) and/or microservices. The architecture 100 includes a management computer 110 and one or more computing nodes 130 that can communicate over a communication channel 180. The communication channel 180 can include a computer network or other interconnect (such as a high-speed backplane connecting the management computer 110 and/or the computing nodes 130). The management computer 110 and the one or more computing nodes 130 can be implemented using a computing environment as described in more detail with reference to FIG. 6. Generally, the components 112, 114, 120, and 132 create a microservice framework for managing applications executing on a cluster of computing nodes (e.g., the computing nodes 130). A given application can be partitioned into one or more microservices that execute on the computing nodes 130.

Each of the computing nodes 130 can host one or more microservices executing on the resources of the computing node. Specifically, a given microservice can execute on the general-purpose computing resources 140 and/or the configurable hardware 150. For example, executable code of the service 134 can be loaded in the memory 144 and the code can be executed using the CPU 142 and/or the configurable hardware 150 including the hardware accelerator 160. The computing node 130 can include service and node management logic 132 for deploying, monitoring, and managing the execution of services executing on the computing node and for configuring the configurable hardware 150. The service and node management logic 132 can include hardware, software, or a combination of hardware and software. As one example, the service and node management logic 132 can be executable software code stored in the memory 144 and executed by the CPU 142.

The service and node management logic 132 can include logic for deploying a microservice on the computing node. For example, the service and node management logic 132 can start a process executing on the CPU 142 and load the memory 144 with executable code of the microservice. The service and node management logic 132 can include initialization or boot-up logic that can enumerate the resources of the computing node and can send information about the resources to the management computer 110. The service and node management logic 132 can include network traffic analysis logic which can be used to monitor network traffic transiting the computing node and network traffic associated with a microservice executing on the computing node. The service and node management logic 132 can include logic for programming (also referred to as configuring) and/or reprogramming the configurable hardware 150. The configurable hardware 150 can be programmed while services on the computing node are executing. Specifically, the service and node management logic 132 can manage the addition or deletion of a hardware accelerator so that a service can continuously operate when transitioning a function of the service from executing on general-purpose resources to an accelerator, and vice versa.

The configurable hardware 150 can include programmable logic such as an field-programmable gate array (FPGA), a programmable logic array (PLA), a programmable array logic (PAL), a generic array logic (GAL), or a complex programmable logic device (CPLD), for example. The configurable hardware 150 can be programmed in various different ways. As one example, the configurable hardware 150 can be programmed by loading a configuration file on control logic of the configurable hardware 150. Specifically, the configurable hardware 150 can include look-up tables (LUTs) that specify truth-tables for combinatorial logic, default values for storage elements (e.g., flip-flops), and connections between different routing channels. The configuration file can include the data that is loaded on the LUTs to control the functionality of the configurable hardware 150. As another example, control logic of the configurable hardware 150 can be programmed based on the values stored in memories (such as random-access memories or register files), so that the functionality of the control logic can be changed by changing the values stored in the memories. As another example, the configurable hardware 150 can include customized hardware that shares resources with other customized hardware, and control logic can be programmed to provide the resources to the selected customized hardware. The configurable hardware 150 can be programmed by writing directly to the configuration memory elements and/or by using a configuration engine (not shown) of the configurable hardware 150. The configuration engine can control the sequencing of the operation and programming of the configurable hardware 150 so that portions of the configurable hardware 150 can be operational while other portions of the configurable hardware 150 are being configured or reconfigured.

The configurable hardware 150 can be programmed to implement one or more hardware accelerators (e.g., hardware accelerator 160). Different types of hardware accelerators can be implemented on the configurable hardware 150. For example, the hardware accelerators can include: security modules supporting blacklists and/or whitelists; DOS traffic pattern analyzers; modules for detecting TCP/IP SYN flooding; modules for automatically generating and validating SYN-Cookies; access control lists (ACLs); privacy-enhanced mail (PEM) support functionality; firewall functionality; hash or security algorithms that are customized for a specific customer and/or geography; low-latency session handling logic; cryptographic and/or compression functionality (e.g., secure sockets layer (SSL) acceleration); algorithms for network traffic load balancing; application layer, content aware functionality; support for virtual private networking (VPN) and other tunneling protocols.

The management computer 110 can manage the distribution and execution of one or more applications on the computing nodes 130. The management computer 110 can include an application manager 112, application and resource state 114, and a service scheduler 120. The application manager 112 and the service scheduler 120 can include hardware, software, or a combination of hardware and software. As one example, the application manager 112 and the service scheduler 120 can be executable software code stored in the memory 111 and executed by the processor(s) 116. The application and resource state 114 can be data that is stored in memory (e.g., memory 111) and/or storage (not shown) of the management computer 110. The application and resource state 114 can include data that is representative of the state of the applications and the computing nodes 130.

The application manager 112 can provide an interface for a user of the management computer 110 to launch, control, remove, and receive results from applications. Each of the applications can be specified using a graphical user interface (GUI), a command-line interface (CLI), and/or a script or program written in a programming language. For example, an application can be composed of different microservices that communicate with each other and the application manager 112. A script, program, or other input can specify which microservices are used for the application and communication channels between the different microservices. Each microservice can be specified using an application programming interface (API) that can include information about the microservice including: a type, a function, interface(s), communication protocol(s), estimated resource requirements, preferred resources, quality-of-service constraints, scheduling policies, and other attributes. For example, the API can specify estimated resource requirements including CPU cores, cryptographic engines, and/or networking bandwidth. The API can specify preferred resources including whether the service can be accelerated with a hardware accelerator (and which hardware accelerator). The API can specify scheduling policies for the service including an affinity or anti-affinity for differently configured computing nodes. As another example, the API can specify advanced features of a service or microservice. For example, the API can specify that the service monitors a usage of the application service and/or network traffic patterns automatically.

An analysis of the monitored usage and/or traffic patterns can be used to determine and initiate possible reconfigurable hardware and system resources for accelerating features in hardware and potentially improving performance of the service. The application manager 112 can determine when a microservice it is to be deployed and/or removed, and the application manager 112 can communicate this information to the service scheduler 120.

The service scheduler 120 can be used to schedule microservices on the computing nodes 130 so that the microservices can be executed. The service scheduler 120 can determine a type, an amount, and an operational state of the different computing resources of the computing nodes 130. For example, the operational state can include an availability of the resources (e.g., whether a specific resource is configured or present on a computing node and how much/many of the resource(s) is/are available) and a utilization of the resources (e.g., whether a specific resource is idle or is being used at full or partial capacity). A scheduling policy can provide rules and/or preferences for scheduling the microservices. For example, the policy can specify how resources are selected (e.g., round-robin, priority-based, and so forth), when services can be deployed, and so forth. The service scheduler 120 can allocate services to computing nodes based on the number and types of microservices to execute, the scheduling policies, and the type, amount, and operational states of the different computing resources of the computing nodes 130.

The service scheduler 120 can include a general-purpose (GP) scheduler 122 that is assisted by other logic of the service scheduler 120 to schedule the microservices. As one example, the general-purpose scheduler 122 can be a Kubernetes scheduler. The general-purpose scheduler 122 may be designed to schedule services based on estimated general-purpose resource requirements of a service and an availability of general-purpose resources. General-purpose resources are resources that are typically used for general-purpose computers. The general-purpose resources can include CPU or processor cores, memory, and storage volumes, for example. The general-purpose scheduler 122 can also recognize and account for various attributes of the services and the resources of the computing nodes 130. For example, a microservice can include an attribute that must be matched or is preferred to be matched to a resource having a matching attribute. As a specific example, a particular microservice can be labeled with a "crypto-req" attribute indicating that the microservice requires a cryptographic accelerator resource. While the general-purpose scheduler 122 may not be designed to recognize special-purpose functional units, the general-purpose scheduler 122 can match the microservice having the "crypto-req" attribute to a computing node that also has the "crypto-req" attribute (indicating that the computing node includes a cryptographic accelerator). The scheduling policies can specify which attributes must be matched for a service to be scheduled and which attributes are preferred to be matched for a service to be scheduled, for example. When the general-purpose scheduler 122 schedules a microservice to a computing node, the general-purpose scheduler 122 can update a mapping of which microservices are executing on which nodes of the computing nodes 130. The mapping can be stored in the application and resource state 114. The mapping can be used to determine which computing nodes are being fully or partially utilized and which computing nodes are available to accept more services. The general-purpose scheduler 122 can also track the services pending to be executed on the computing nodes 130.

The service scheduler 120 can include a service controller 124 for analyzing the operational state of the services and resources and updating the application and resource state 114. The service controller 124 can receive data associated with the computing-node level, the resource level, and the service level. For example, the service controller 124 can receive data from the computing nodes 130 indicating that new resources are available. New resources can become available when a computing node is added or reset, and an enumeration of the resources can be sent to the service controller 124 during an initialization sequence of the computing node. New resources can become available when a hardware accelerator is configured or reconfigured. The service controller 124 can decorate the application and resource state 114 with attributes that are representative of special-purpose hardware and functionality supported by a computing node. The service controller 124 can receive data from the computing nodes 130 indicating that a type of operation is being performed relatively frequently for a service and that a hardware accelerator is capable of assisting the execution of the service. If configurable resources are available, the service controller 124 can cause the hardware accelerator to be configured on the available configurable resources to assist in the execution of the service. The hardware accelerator can be added independently of decisions made by the general-purpose scheduler 122. In this manner, the computing nodes 130 can be adjusted based on dynamic real-time operational data that may be independent of an initial scheduling decision for the microservice. The adaptive nature of the computing nodes can potentially enable more performant, secure, and/or available services compared to services that are statically scheduled on general-purpose non-adaptive computing nodes.

The service controller 124 can update the application and resource state 114 to indicate changes to the computing nodes 130. Specifically, the service controller 124 can decorate the application and resource state 114 with data indicating that the hardware accelerator was programmed on the computing node. The service controller 124 can receive information about the network traffic, resource utilization, and other operational state of the computing nodes 130 and the services executing on the computing nodes 130, and can update the application and resource state 114 to reflect the operational states. For example, the application and resource state 114 can include a mapping of the different microservices to the computing nodes 130, a configuration of each of the computing nodes 130 (such as whether a hardware accelerator is configured and which hardware accelerators are configured), a utilization of each of the resources computing nodes 130, and other information related to the application and/or the computing nodes 130. The different operational states can be represented with attributes stored in the application and resource state 114 and the attributes can be used by the general-purpose scheduler 122 to schedule more services to the computing nodes 130. In this manner, the service controller 124 can assist the general-purpose scheduler 122 in scheduling the microservices among the computing nodes 130.

Figure 2:
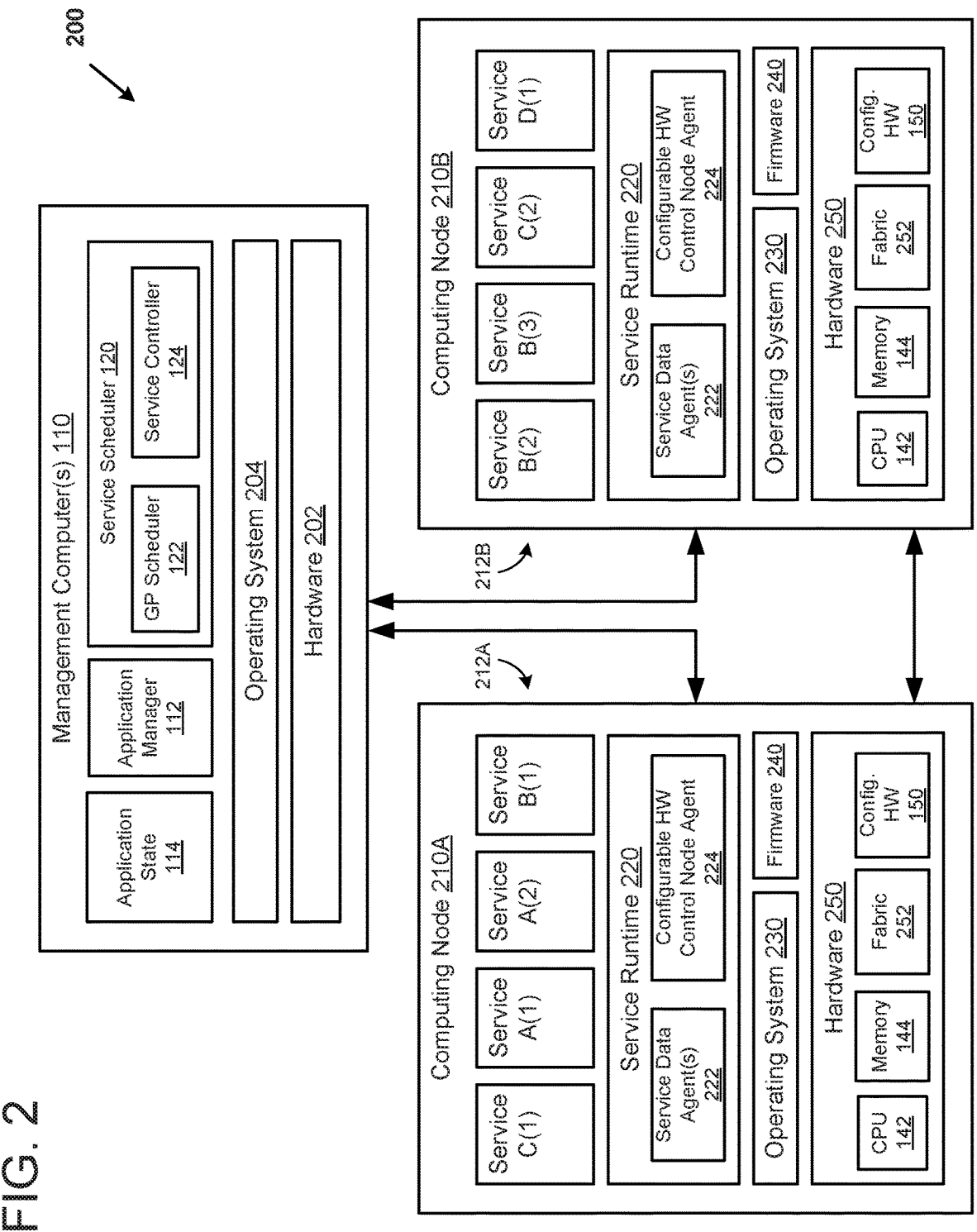
FIG. 2 is a block diagram of an architecture including configurable computing resources, the architecture capable of executing a workload composed of one or more services.

FIG. 2 is a block diagram of an architecture 200 including configurable computing resources (e.g., configurable hardware 150). The architecture 200 is capable of executing a workload composed of one or more services (e.g., services 212A-B), which can be managed by a microservices framework. For example, the microservices framework can include an application manager 112, application state 114, a service scheduler 120, and the service runtime 220. The functions of the microservices framework can be distributed among a management computer 110 and computing nodes 210A-B. It should be noted that while only two computing nodes are illustrated, more or fewer computing nodes are possible. Also, for ease of description, a single computing node of the computing nodes 210A-B may be referred to as the computing node 210. It should also be noted that the functions of the microservices framework can be distributed in other ways across the management computer 110 and the computing nodes 210A-B.

The management computer 110 and the computing nodes 210A-B are illustrated to show a software stack of the architecture 200. A software stack is a set of systems and components used to create a software platform. Applications can be executed on or run on the software platform. Similar to the OSI model, a software stack can be used to partition different functions of a software platform into abstraction layers. A particular layer provides a communication path with the layers adjacent (e.g., a layer above and a layer below) to the particular layer. Although a particular stack is illustrated, those skilled in the art and provided with this disclosure will recognize that other stacks are possible.

The management computer 110 can include computer hardware 202 for storing and executing computer instructions that carry out the functionality of the management computer 110. For example, the hardware 202 can include the processor(s) 116 and the memory 111. The hardware 202 can interface with an operating system 204. The operating system 204 can provide an operating environment for other software executing on the management computer 110 and can coordinate activities of the hardware and software components of the management computer 110. The application manager 112, application state 114, and the service scheduler 120 can communicate with the operating system 204. In one example, the management computer 110 components can be running in one or more virtual machines (VMs) executing on a cloud-based computing environment that is managed or supervised by a hypervisor.

The computing node 210 can include computer hardware 250 for performing operations that carry out the functionality of the computing node 210. For example, the hardware 250 can include general-purpose computing resources (e.g., the CPU 116 and the memory 111) and special-purpose and/or configurable computing resources (e.g., the routing fabric 252 and the configurable hardware 150). As one example, the routing fabric 252 can be configurable hardware that can be programmed to vary an amount of network bandwidth allocated to a given service that is executing on the computing node 210. The hardware 250 can interface with an operating system 230 and/or firmware 240. The operating system 230 can provide an operating environment for other software executing on the computing node 210 and can coordinate activities of the hardware and software components of the computing node 210. The firmware 240 can include configuration data for programming the configurable hardware 150 and/or the routing fabric 252.

The service runtime 220 can interface with the operating system 230, the firmware 240, and the services 212. The service runtime 220 can provide an operating environment for microservices to execute and communicate with each other and other agents over a network. For example, the service runtime 220 can provide storage, computation, networking, and memory resources for the microservices executing on the service runtime 220. The resources provided by the service runtime 220 can be abstracted from the physical resources of the computing node 210 so that the services can be portable across different hardware platforms. The service runtime 220 can isolate the services from each other to provide more consistent availability of resources and more security. The service runtime 220 can control an amount of resources that are available to a given microservice. For example, a microservice can be assigned to execute on the computing node and the microservice can be allocated a budgeted amount of processor and memory resources. The service runtime 220 can enforce the budgeted amount of processor and memory resources so that the collection of microservices executing within the service runtime 220 do not exceed the amount of computing resources of the computing node 210. The service scheduler 120 can track the amount of computing resources available on the computing node 210 and only schedule microservices to the computing node 210 that can execute within the total amount of computing resources of the computing node 210. During initialization of the computing node 210, the service runtime 220 can report the resources available on the computing node 210 to the service scheduler 120.

The service runtime 220 can monitor and analyze network traffic transiting the computing node 210, originating at a given service, and/or terminating at a given service. Specifically, a service data agent 222 can be used to monitor and analyze the network traffic associated with a given service. The network traffic can be analyzed to determine an amount of traffic, a type of traffic, or other attributes of the traffic. For example, packet headers of the network traffic can be parsed to collect the attributes of the traffic. As one example, the analysis can include measuring the amounts of network traffic to each service executing on the computing node 210 and comparing the amounts of network traffic processed by each of the services. The analysis can include determining a relative proportion of the network traffic processed by a given service compared to other services executing on the computing node. The service runtime 220 can send the analysis data to the service controller 124 of the service scheduler 120. The service controller 124 use the analysis to determine whether a hardware accelerator can be used to assist with the execution of any of the services executing on the computing node 210. When more than one service can be assisted by hardware accelerators, the service controller 124 can select which hardware accelerator is to be implemented on the computing node 210. The service controller 124 can request that a hardware accelerator be implemented by sending a request to the service runtime 220.

The service runtime 220 can manage the operation and configuration of the configurable hardware 150. The service runtime 220 can process requests to implement a hardware accelerator or otherwise configure the configurable hardware 150. When a hardware accelerator is to be implemented, the configurable hardware control node agent 224 can load the configuration data onto control logic of the configurable hardware 150 so that the hardware accelerator will be implemented. As one example, the configurable hardware control node agent 224 can interface with an access port of the configurable logic 150 and send configuration data (also referred to as a bit file) to the control logic of the configurable logic 150. The service runtime 220 can manage the transition of a service from using only general-purpose computing resources (CPU 142 and memory 144) to the service adding a hardware accelerator on the configurable hardware 150. For example, the service runtime 220 can load software drivers and/or executable files that are executed when the hardware accelerator is used. Additionally, the service runtime 220 can process requests to stop using a hardware accelerator and/or to reconfigure the configurable hardware 150. For example, the service controller 124 can determine that the configurable logic 150 can be more efficiently utilized if a different hardware accelerator were deployed instead of the currently deployed hardware accelerator. The service controller 124 can send a request to reconfigure the configurable logic 150 to implement the new hardware accelerator. The service runtime 220 can manage the removal of the currently deployed hardware accelerator and addition of the new hardware accelerator. The service runtime 220 can notify the service controller 124 when a hardware accelerator is implemented and/or removed. The application state 114 can be updated to indicate any hardware accelerator(s) implemented on the computing node 210 and the service scheduler 120 can schedule new services to the computing node 210 based on the updated information.

As a specific example, the management computer 110 and the computing nodes 210A-B can be reset or powered on. Each of the computing nodes 210A-B can enumerate their resources and the capabilities of the computing nodes can be sent to the service scheduler 120. Initially, the only resources reported by the computing nodes 210A-B may be the general-purpose resources (CPU and memory capabilities) and an amount of unconfigured configurable logic 150. Alternatively, the configurable logic 150 can be configured with one or more default accelerators, and the presence of the default accelerators can be sent to the service scheduler 120. The default accelerators can be accounted for by assigning attributes corresponding the accelerators to the computing nodes 210A-B that implement the accelerators. In this manner, the service scheduler 120 can account for all of the resources that are available on the cluster comprising the computing nodes 210A-B. The application manager 112 can manage the execution of application comprising different microservices. A list or other data structure including the microservices to execute can be sent to the scheduler 120 so that the scheduler 120 can assign the microservices to the available resources. When there are no accelerators implemented on the computing nodes 201A-B, the scheduler 120 can allocate the microservices to the computing nodes 210A-B based only on the general-purpose resource estimates of the microservices being scheduled. As a specific example, the services A(1), B(1), and C(1) can be assigned to computing node 210A based on the available general-purpose resources of node 210A and the estimated or budgeted resources for the services A(1), B(1), and C(1). In this illustration, the letter (e.g., A, B, C) indicates a type of the microservice and the number in parenthesis indicates the instance of the microservice, where 1 is the first deployed instance, 2 is the second deployed instance, and so forth.

The service runtime 220 can analyze the network traffic transiting the computing node 210A during the execution of the services A(1), B(1), and C(1). The analysis may indicate that the service A(1) is receiving a higher proportion of network traffic than the services B(1) and C(1). Additionally or alternatively, the analysis may indicate that the service A(1) performs computationally expensive operations that can be sped up using a selected hardware accelerator. Specifically, the analysis can determine that the selected hardware accelerator is capable of assisting the execution of the service A(1). The service controller 124 can send a request to the service runtime 220 to have the selected hardware accelerator programmed on the configurable hardware 150. Once implemented (e.g., programmed), the service controller 124 can transition the service A(1) to use the accelerator and can send an update to the service scheduler 120 indicating that the selected hardware accelerator is present on the computing node 210A. The service scheduler 120 can assign future services to the computing node 210A based on the updated availability of resources (e.g., the amount of general-purpose resources and the presence of hardware accelerators) and the scheduling policies. For example, the policies may indicate that services of type A have an affinity for computing node 210A and other types of services have an anti-affinity for computing node 210A. The next services scheduled, B(2), C(2), and D(1) can be assigned to computing node 210B. For example, the non-type-A services can be scheduled on computing nodes that are different from the computing node 210A due to the anti-affinity for non-type-A service on node 210A. The next service to be scheduled can be service A(2) on computing node 210A to account for the affinity of type A services on that node. By grouping similar services on a common computing node, some of the resources (e.g., the hardware accelerator) can be shared to make these services execute more efficiently. Finally, the service D(1) can be scheduled to the computing node 210B.

Figure 3:
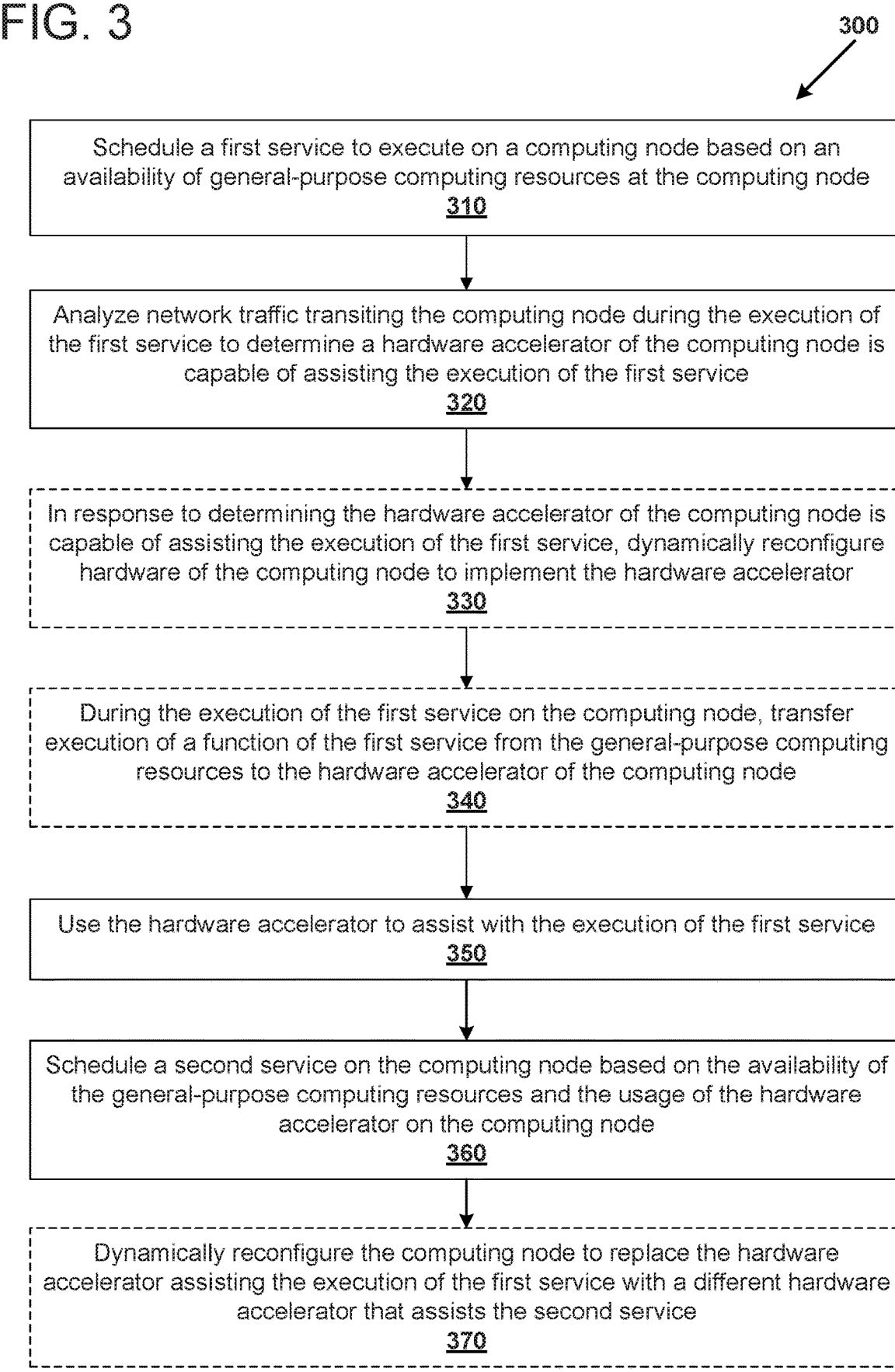
FIG. 3 is a flowchart of an example method for scheduling services on a platform including configurable computing resources.

Example Methods of Scheduling Services on a Platform Including Configurable Computing Resources FIG. 3 is a flowchart of an example method 300 of scheduling services on a platform including configurable computing resources. The platform can include a microservices framework and a plurality of computing nodes. Each computing node can include both general-purpose computing resources and configurable computing resources. For example, the method 300 can be implemented using the architectures 100 or 200, such as described above in reference to FIGS. 1 and 2. As one example, computer-executable instructions for carrying out the method 300 can be stored in computer-readable memory (e.g., the memories 111 and/or 144) and the instructions can be executed by one or more processor(s) (e.g., the processor 116 and/or the CPU 142) to perform the method 300.

At 310, a first service can be scheduled to execute on a computing node based on an availability of general-purpose computing resources at the computing node. The computing node can be selected from the plurality of computing nodes. As one example, a general-purpose scheduler can schedule the service based on budgeted general-purpose computing resources of the service and the availability of general-purpose computing resources at the computing node. The general-purpose computing resources can be processing capability (e.g., CPUs) and an amount of memory.

At 320, network traffic transiting the computing node can be analyzed during the execution of the first service to determine a hardware accelerator of the computing node is capable of assisting the execution of the first service. Analyzing the network traffic transiting the computing node can include determining a type of network traffic processed by the first service. Analyzing the network traffic transiting the computing node can include determining a relative proportion of the network traffic processed by the first service compared to other services executing on the computing node. Analyzing the network traffic can include identifying a nature (e.g., a type) and/or a pattern of the network traffic for the first service and/or for all of the services executing on the computing node. Determining the hardware accelerator of the computing node is capable of assisting the execution of the first service can include determining that the first service will process network traffic at an increased rate using the hardware accelerator than by using only the general-purpose computing resources of the computing node. As another example, the execution of the first service can be assisted by making the first service more secure, more available, more energy efficient, and/or by adding additional features. As another example, the execution of the first service can be assisted by selecting an appropriate hardware accelerator that matches the nature and/or pattern of the network traffic.

At 330, in response to determining the hardware accelerator of the computing node is capable of assisting the execution of the first service, hardware of the computing node can optionally be dynamically reconfigured to implement the hardware accelerator. Generally, configurable hardware of the computing node can be preconfigured, configured, and/or reconfigured. Preconfigured configurable hardware can include configurable hardware that is performs a default function before it is programmed by a user or agent. Configured configurable hardware can include configurable hardware that has been programmed by a user or agent to perform a particular function. Reconfigured configurable hardware can include configurable hardware that was programmed to perform a particular function and then the configurable hardware is programmed to perform a different function. Dynamic reconfiguration can include changing the programming of a portion of the configurable hardware during the operation of another portion of the configurable hardware. Reconfiguration of the configurable hardware can include transitioning lower priority services back to executing on general-purpose resources from executing on a hardware accelerator.

At 340, during the execution of the first service on the computing node, execution of a function of the first service can optionally be transferred from the general-purpose computing resources to the hardware accelerator of the computing node. For example, the first service can be fully or partially implemented on the hardware accelerator. Transferring the function may free up general-purpose computing resources which can be added to the resources available to schedule additional services to the computing node. Transferring the function can be transparent to a consumer of the service. When the hardware accelerator becomes operational, it can be added a resource of the computing node, and new services can be scheduled to the computing node based on the presence of the hardware accelerator. As one example, an attribute of the computing node can be used to indicate the presence of the hardware accelerator.

At 350, the hardware accelerator can be used to assist with the execution of the first service. For example, the hardware accelerator can be used in conjunction with the general-purpose computing resources to execute the service.

At 360, a second service can be scheduled on the computing node based on the availability of the general-purpose computing resources and the usage of the hardware accelerator on the computing node. For example, a general-purpose scheduler can be notified of the presence of the hardware accelerator by associating an attribute representative of the hardware accelerator with the computing node. APIs of the services can include one or more attributes that can be matched to computing resources having matching attribute(s). Scheduling policies can determine whether a given attribute is required to be matched or preferred to be matched.

At 370, the computing node can optionally be dynamically reconfigured to replace the hardware accelerator assisting the execution of the first service with a different hardware accelerator that assists the second service. For example, a change can be detected in a proportion of network traffic processed by the first service to network traffic processed by the second service. For example, the network traffic processed by the first service can be decreasing while the network traffic processed by the second service is increasing, or vice versa. The dynamic reconfiguration can be in response to detecting the change.

Figure 4:
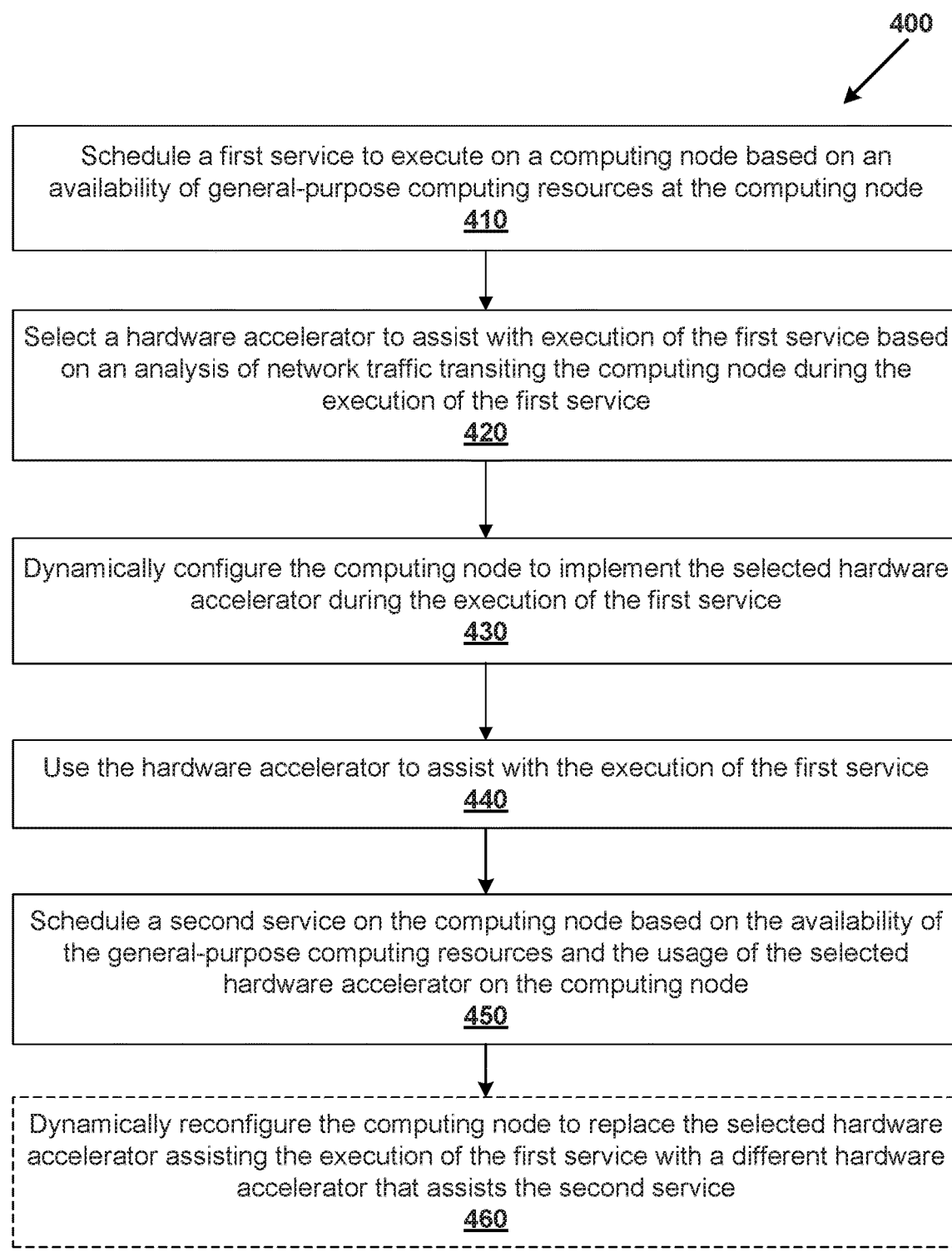
FIG. 4 is a flowchart of an example method for scheduling services on a platform including configurable computing resources.

FIG. 4 is a flowchart of an example method 400 of scheduling services on a platform including configurable computing resources. The platform can include a microservices framework and a plurality of computing nodes. Each computing node can include both general-purpose computing resources and configurable computing resources. For example, the method 400 can be implemented using the architectures 100 or 200, such as described above in reference to FIGS. 1 and 2. As one example, computer-executable instructions for carrying out the method 400 can be stored in computer-readable memory (e.g., the memory 111 and/or 144) and the instructions can be executed by one or more processor(s) (e.g., the processor 116 and/or the CPU 142) to perform the method 400.

At 410, a first service can be scheduled to execute on a computing node based on an availability of general-purpose computing resources at the computing node. The computing node can be selected from the plurality of computing nodes. As one example, a general-purpose scheduler can schedule the service based on budgeted general-purpose computing resources of the service and the availability of general-purpose computing resources at the computing node. The general-purpose computing resources can be processing capability (e.g., CPUs) and an amount of memory.

At 420, a hardware accelerator can be selected to assist with execution of the first service based on an analysis of network traffic transiting the computing node during the execution of the first service. The hardware accelerator can be selected to make the first service have more features, execute faster, and/or be more secure, more available, and/or more energy efficient. As one example, the hardware accelerator can be selected to process network traffic. For example, the hardware accelerator can include: security modules supporting blacklists and/or whitelists; DOS traffic pattern analyzers; modules for detecting TCP/IP SYN flooding; modules for automatically generating and validating SYN-Cookies; access control lists (ACLs); privacy-enhanced mail (PEM) support functionality; firewall functionality; hash or security algorithms that are customized for a specific customer and/or geography; low-latency session handling logic; cryptographic and/or compression functionality (e.g., secure sockets layer (SSL) acceleration); algorithms for network traffic load balancing; application layer, content aware functionality; support for virtual private networking (VPN) and other tunneling protocols.

At 430, the computing node can be dynamically configured to implement the selected hardware accelerator during the execution of the first service. Dynamically configuring the hardware accelerator can include programming of a portion of the configurable hardware during the operation of another portion of the configurable hardware. Configuring the hardware accelerator can include writing data to memories, register files, or other storage elements that control how the configurable hardware operates. Configuring the hardware accelerator can include loading configuration data (e.g., a bit file) to the configurable hardware using an access port of the configurable hardware.

At 440, the hardware accelerator can be used to assist with the execution of the first service. For example, the hardware accelerator can be used in conjunction with the general-purpose computing resources to execute the service.

At 450, a second service can be scheduled on the computing node based on the availability of the general-purpose computing resources and the usage of the hardware accelerator on the computing node. For example, a general-purpose scheduler can be notified of the presence of the hardware accelerator by associating an attribute representative of the hardware accelerator with the computing node. APIs of the services can include one or more attributes that can be matched to computing resources having matching attribute(s). Scheduling policies can determine whether a given attribute is required to be matched or preferred to be matched.

At 460, the computing node can optionally be dynamically reconfigured to replace the hardware accelerator assisting the execution of the first service with a different hardware accelerator that assists the second service. For example, a change can be detected in a proportion of network traffic processed by the first service to network traffic processed by the second service. For example, the network traffic processed by the first service can be decreasing while the network traffic processed by the second service is increasing, or vice versa. The dynamic reconfiguration can be in response to detecting the change. In general, the selection and configuration of which hardware accelerator(s) are implemented on the configurable resource(s) on the computing worker node can be determined based on one or more of a utilization of the services executing on the node and/or the types and amount of network traffic transiting the node. As one example, the selection of the hardware accelerator to implement can be based on a single service (e.g., a service may require a hardware accelerator to be implemented on the computing node it is scheduled on). As another example, the selection of the hardware accelerator to implement can account for the utilization of some or all of the services executing on the node so that the hardware accelerator can be selected to provide the best performance for the computing node. The computing node can implement one or multiple different hardware accelerator(s) concurrently using the same or different configurable hardware on the computing node. For example, the configurable logic can include multiple reconfigurable regions, where each region can be reconfigured at different times and with different accelerators. As another example, a configurable pipeline can support multiple accelerator functions using different look-up tables, microcode, and/or control logic.

Example Computing Environments

Figure 5:
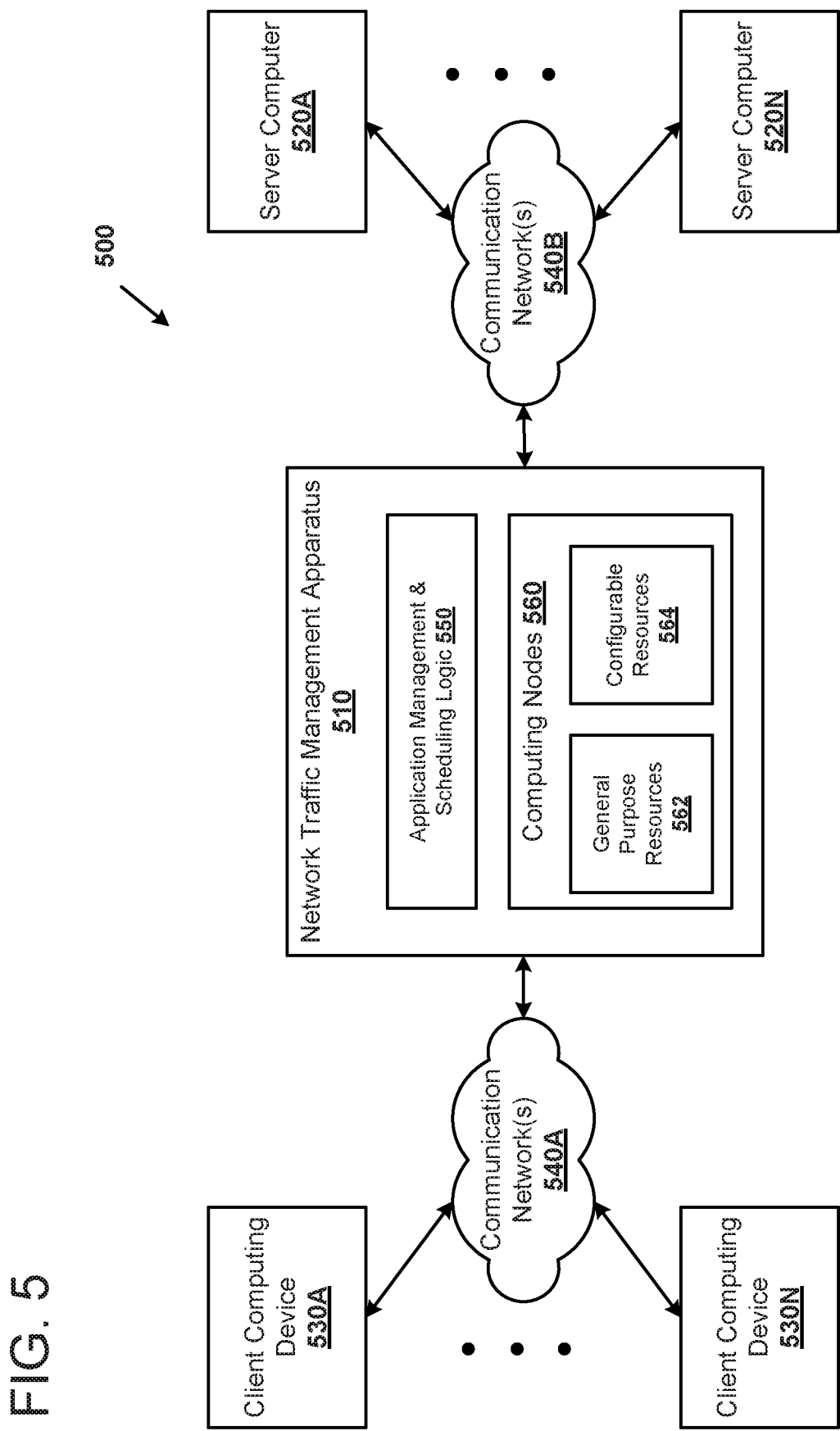
FIG. 5 is a block diagram of an example client-server architecture including a network traffic management apparatus implementing a method for scheduling services on a platform including configurable computing resources.

FIG. 5 illustrates an example client-server architecture 500 (also referred to as a network traffic management system) that incorporates a network traffic management apparatus 510. The client-server architecture 500 includes a network traffic management apparatus 510 that is coupled to one or more server computers (such as server computers 520A-N) and one or more client devices (such as client computing devices 530A-N) via one or more communication networks (such as the communication networks 540A and 540B). The server computers 520A-N can communicate with one or more additional server computer(s) that are accessible via the communication networks 540A. As one example, the communication network 540A can include a public network (e.g., the Internet) and devices attached to the network 540A can be accessed using public network addresses; the communication network 540B can include a private network and devices attached to the network 540B can be accessed using private network addresses.

The communication networks 540A-B can include various wired and/or wireless communication technologies, such as a local area network (LAN), a wide area network (WAN), an intranet, the Internet, a public switched telephone network (PSTN), and so forth. The devices connected to the communication networks 540A-B can communicate with each other using various communications protocols, such as transmission control protocol with Internet protocol (TCP/IP) over Ethernet and/or other customized or industry-standard protocols. The communication protocols can be used to transmit information over the networks 540A-B using packet-based messages (e.g., Ethernet-based packet data networks) and/or other application programming interfaces (APIs). An API is a programmatic interface (e.g., a set of methods and/or protocols) for communicating among different modules. The communication networks 540A-B can include various network devices, such as switches (multilayer or single-layer), routers, repeaters, gateways, network bridges, hubs, protocol converters, bridge routers, proxy servers, firewalls, network address translators, multiplexers, network interface controllers, wireless network interface controllers, modems, line drivers, and wireless access points, for example. As illustrated, the network traffic management apparatus 510 is positioned in-line between the client computing devices 530A-N and the server computers 520A-N so that the network traffic management apparatus 510 can intercept all network traffic flowing between the different networks 540A and 540B. In other examples, the network traffic management apparatus 510, the server computer 520A-N, and the client devices 530A-N can be coupled together via other topologies. As one specific example, the server computers 520A-N can be integrated within the network traffic management system 500 (e.g., server computer functions can be implemented in software within one or more devices of the network traffic management apparatus 510). It should be appreciated by one of ordinary skill in the art having the benefit of the present disclosure, that the network topology illustrated in FIG. 5 has been simplified and that multiple networks and networking devices can be utilized to interconnect the various computing systems disclosed herein. Additionally, one or more of the devices of the client-server architecture 500 in these examples can be in a same or a different communication network including one or more public, private, or cloud networks, for example.

Figure 6:
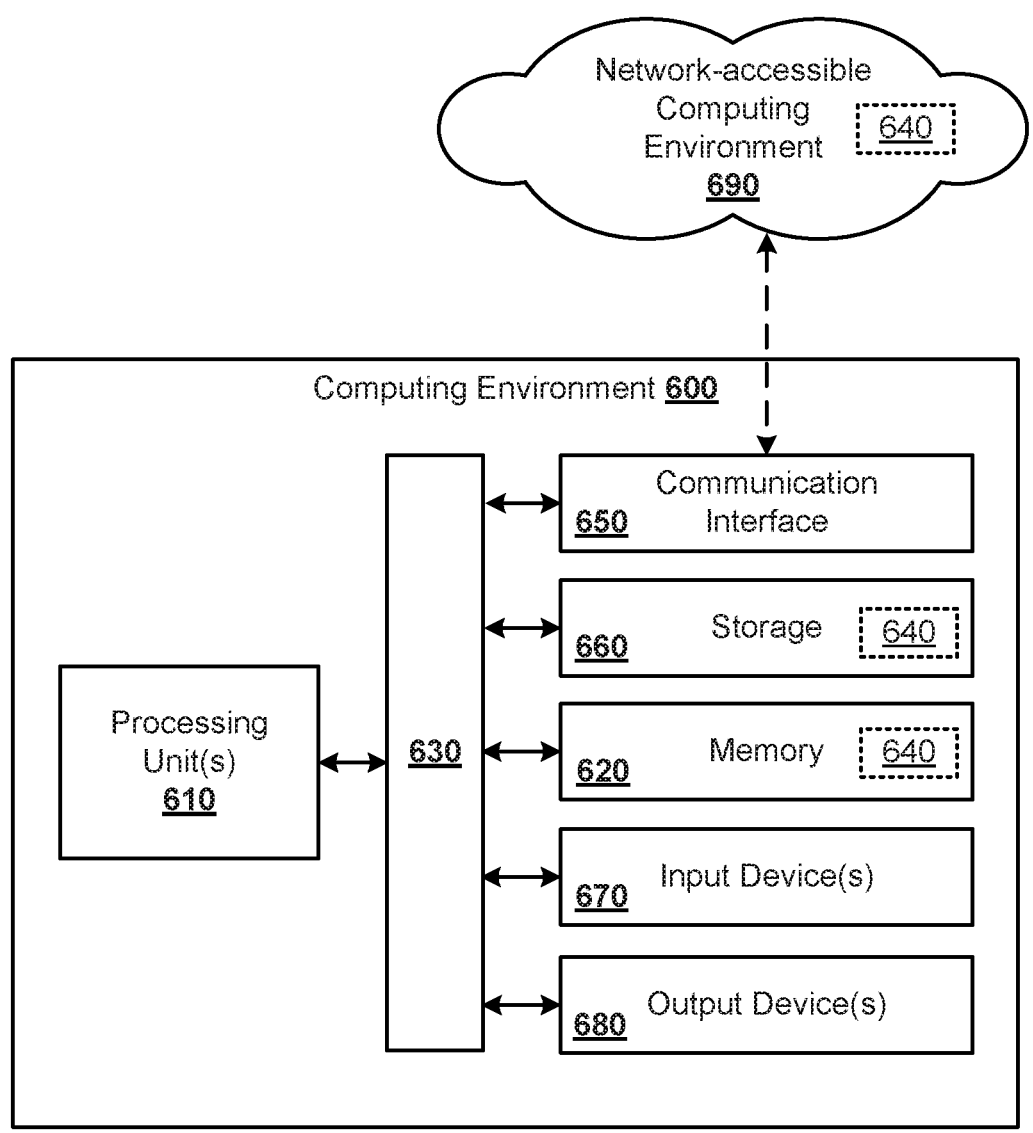
FIG. 6 is a block diagram of an example computing environment, such as can be used for a server computer.

Generally, the server computers 520A-N, the client devices 530A-N, and the network traffic management system 500 can perform various computing tasks that are implemented using a computing environment, such as the computing environment described in more detail with respect to FIG. 6. The computing environment can include computer hardware, computer software, and combinations thereof. As a specific example, the computing environment can include general-purpose and/or special-purpose processor(s), configurable and/or hard-wired electronic circuitry, a communications interface, and computer-readable memory for storing computer-executable instructions to enable the processor(s) to perform a given computing task. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations.

The client devices 530A-N can include any type of computing device that can exchange network data, such as mobile communication devices, laptop computers, desktop computers, tablet computers, virtual machines executing within a cloud-computer-based environment, and so forth.

The client devices 530A-N can run interface applications, such as web browsers or standalone client applications, which may provide an interface to communicate with (e.g., make requests for, and receive content stored on) one or more of the server computers 520A-N via the communication network(s) 540A and 540B. The client devices 530A-N can further include an output device (such as a display screen or touchscreen (not illustrated)) and/or an input device (such as a keyboard (not illustrated)). Additionally, one or more of the client devices 530A-N can be configured to execute software code (e.g., JavaScript code within a web browser) in order to log client-side data and provide the logged data to the network traffic management apparatus 510 or the server computers 520A-N.

The server computers 520A-N can include any type of computing device that can exchange network data. For example, the server computers 520A-N can exchange network data with the client devices 530A-N and with each other. As another example, the server computers 520A-N can exchange communications along communication paths specified by application logic in order to facilitate a client-server application interacting with the client devices 530A-N. Examples of the server computers 520A-N can include application servers, database servers, access control servers, and encryption servers. Accordingly, in some examples, one or more of the server computers 520A-N process login and other requests received from the client devices 530A-N via the communication network(s) 540A and 540B according to the Hypertext Transfer Protocol (HTTP) or Hypertext Transfer Protocol Secure (HTTPS) application-layer protocol. A web application may be operating on one or more of the server computers 520A-N and transmitting data (e.g., files or web pages) to the client devices 530A-N (e.g., via the network traffic management apparatus 510) in response to requests from the client devices 530A-N. The server computers 520A-N can be hardware and/or software and may represent a system with multiple servers in a pool, which may include internal or external networks.

While the server computers 520A-N are illustrated as single devices, one or more actions of each of the server computers 520A-N may be distributed across one or more distinct network computing devices that together comprise one or more of the server computers 520A-N. Moreover, the server computers 520A-N are not limited to a particular configuration. Thus, the server computers 520A-N may contain network computing devices that operate using a coordinated approach, whereby one of the network computing devices of the server computers 520A-N operate to manage or otherwise coordinate operations of the other network computing devices. Each of the server computers 520A-N can operate as a networked computing device within a cluster architecture, a computing device within a peer-to peer architecture, a virtual machine, or a resource within a cloud-based computer architecture, for example. Thus, the technology disclosed herein is not to be construed as being limited to a single environment and other configurations and architectures are also envisaged. For example, one or more of the server computers 520A-N can operate within the network traffic management apparatus 510 itself rather than as a stand-alone server device communicating with the network traffic management apparatus 510 via communication network 540B. In this example, the one or more of the server computers 520A-N operate within the memory of the network traffic management apparatus 510.

The network traffic management apparatus 510 can include any type of computing device that can be used for managing network traffic. The network traffic management apparatus 510 can perform a number of functions, including providing network security, access control, load balancing network traffic across the server computers 520A-N, and/or accelerating network traffic associated with an application hosted by one or more of the server computers 520A-N, for example. Each of the functions can be performed by a service. The services can be incorporated into workloads that are executed by the network traffic management apparatus 510 For example, the network traffic management apparatus 510 can include a workload that is used to perform proxy and other services on behalf of the server 520A-N and to manage traffic between the clients 530A-N and the servers 520A-N. Additionally, the network traffic management apparatus 510 can include other network devices such as one or more routers or switches, for example.

The network traffic management system 500 can be tenant, service, and network aware. The computing nodes 560 can be used to execute application services for one or more tenants. Each application service can be replicated so that multiple instances of a given application service execute on the computing nodes 560. The application services can be initially scheduled on one or more of the computing nodes based on general-purpose resources 562. As the services execute, the system 500 can monitor and analyze the computing and networking resources and use the analysis to adapt the system 500 (using the configurable resources 564) based on the current loading caused by the pattern of the network traffic and the execution of the application services. The analysis and adaption can occur independently on each of the computing nodes 560. Additionally, the analysis can occur at the cluster level (taking into account the multiple service instances executing on the cluster of computing nodes 560) using service control functions to further adapt the system 500 using the configurable resources 564.

In one example, the network traffic management apparatus 510 can include application management and scheduling logic 550 and computing nodes 560. Each of the computing nodes 560 can include general-purpose computing resources 562 and configurable computing resources 564. For example, the services can include computer-executable instructions that are loaded into computer-readable memory and executed by a processor of the general-purpose computing resources 562. The computing nodes 560 can also include traffic monitoring and configuration logic (not shown) that can be used for adapting (e.g., reconfiguring) hardware of the configurable computing resources 564 to assist the services executing on the computing nodes 560. For example, the configurable computing resources 564 can be programmed to accelerate a performance of the service, enable the service to operate more securely, and/or enable the service to be more available. The application management and scheduling logic 550 can be used to launch, control, monitor, and tear down services executing on the computing nodes 560. Specifically, the application management and scheduling logic 550 can schedule services to execute on general purpose computing resources 562 and/or the configurable computing resources 564 as illustrated above with reference to FIGS. 1-4.

While the network traffic management apparatus 510 is illustrated in this example as including a single device, the network traffic management apparatus 510 in other examples can include a plurality of devices or blades each having one or more processors (each processor with one or more processing cores) that implement one or more components of this technology. In these examples, one or more of the devices can have a dedicated communication interface or memory. Alternatively, one or more of the devices can utilize the memory, communication interface, or other hardware or software components of one or more other devices included in the network traffic management apparatus 510. Additionally, the network traffic management apparatus 510 and/or the application(s) executed by the network traffic management apparatus 510 can be operative in a cloud-based computing environment. The application(s) can be executed within or as virtual machine(s) or virtual server(s) that can be managed in a cloud-based computing environment. For example, the application(s), and even the network traffic management apparatus 510 itself, can be located in virtual server(s) running in a cloud-based computing environment rather than being tied to one or more specific physical network computing devices. Also, the application(s) can be running in one or more virtual machines (VMs) executing on the network traffic management apparatus 510. Additionally, in one or more examples of this technology, virtual machine(s) running on the network traffic management apparatus 510 can be managed or supervised by a hypervisor. Additionally, one or more of the components that together comprise the network traffic management apparatus 510 can be standalone devices or integrated with one or more other devices or apparatuses, such as with one or more of the server computers 520A-N, for example.

Additionally, one or more of the components depicted in the client-server architecture 500, such as the network traffic management apparatus 510, server computers 520A-N, or client computing devices 530A-N, for example, may be configured to operate as virtual instances on the same physical machine. In other words, one or more of the network traffic management apparatus 510, server computers 520A-N, or client computing devices 530A-N may operate on the same physical device rather than as separate devices communicating through communication networks 540A and 540B. Additionally, there may be more or fewer network traffic management apparatuses, client computing devices, or server computers than illustrated in FIG. 5.

FIG. 6 illustrates a block diagram of a generalized example of a suitable computing environment 600 that can be used to implement the examples, techniques, and technologies described herein. For example, the computing environment 600 can be used to implement a network traffic management apparatus including an intermediary server that performs the disclosed techniques for scheduling services on a platform including configurable computing resources.

The computing environment 600 includes at least one processing unit 610 and computer-readable memory 620, which are coupled together by an interconnect 630. The processing unit 610 executes computer-executable instructions. The processing unit 610 can include a general-purpose processor, a special-purpose processor, and combinations thereof. For example, the processing unit 610 can include a general-purpose central processing unit (CPU), a graphics processor, a processor in an application-specific integrated circuit (ASIC), a processor configured to operate using programmable logic (such as in a field-programmable gate array (FPGA)), and/or any other type of processor. In a multi-processing system, multiple processing units can be used to execute computer-executable instructions to increase processing power.

The memory 620 stores software 640 implementing one or more innovations described herein, in the form of computer-executable instructions suitable for execution by the processing unit 610. Specifically, the memory 620 can be used to store computer-executable instructions, data structures, input data, output data, and other information. The memory 620 can include volatile memory (e.g., registers, cache, random-access memory (RAM)), non-volatile memory (e.g., read-only memory (ROM), electrically-erasable programmable ROM (EEPROM), and flash memory), and/or combinations thereof. The memory 620 can include operating system software (not illustrated). Operating system software can provide an operating environment for other software executing in the computing environment 600 and can coordinate activities of the components of the computing environment 600.

The interconnect 630 is used to connect different components of the computing environment 600 together so that the processing unit 610 can communicate with the different components and/or so that the different components can communicate with each other. For example, the interconnect 630 can include a bus, controller, and/or a network. As one example, the interconnect 630 can include a host bridge (also referred to as a northbridge) for connecting the processing unit 610 to relatively high-speed components (such as the memory 620) and an input/output bridge (also referred to as a southbridge) for connecting to relatively lower-speed components (such as a communications interface 650) within the computing environment 600. In some examples, one or more components of the computing environment 600 can be integrated within or connected directly to the processing unit 610.

The computing environment 600 can include a communication interface 650 for communicating with another computing entity using a communication medium (e.g., a physical layer). The communication interface 650 can implement all or a portion of a network protocol stack. The network protocol stack defines communication formats and rules for communicating between different devices connected to a network. For example, the network protocol stack can define modular layers for communication using the Open Systems Interconnection (OSI) model or another model. The OSI model standardizes and partitions a communication system into seven layers including a physical layer (referred to as layer 1) and an application layer (referred to as layer 7). The application layer can be used to define how applications access the communications subsystem. The physical layer defines the electrical and physical specifications for communication over a communication medium (also referred to as a physical transmission medium). The communication medium can be used to convey information, such as computer-executable instructions or other data, in a modulated data signal. A modulated data signal is a signal that has one or more of its characteristics adjusted in such a manner as to encode information in the signal. The communication interface 650 can include electronic and/or optical circuitry to receive and transmit communications signals that are encoded (e.g., according to a physical layer specification of the network stack) using an electrical, optical, radio-frequency (RF), or another carrier signal. Accordingly, the communication interface 650 can be used to communicate over wired connections (e.g., twisted-wire pair, coaxial cable, and fiber optic connections) and/or wireless technologies (e.g., Bluetooth, WiFi (IEEE 802.11), and cellular). As a specific example with reference to FIG. 5, a communication interface of the network traffic management apparatus 510 operatively couples to and communicates with the communication networks 540A and 540B so that the network traffic management apparatus 510 is coupled to and can communicate with the server computers 520A-N and the client computing devices 530A-N.

The computing environment 600 can include storage 660 that is used to store instructions for the software 640, data structures, and data, which can be used to implement the technologies described herein. The storage 660 can include electronic circuitry for reading and/or writing to removable or non-removable storage media using magnetic, optical, or other reading and writing system that is coupled to the processor. The storage 660 can include read-only storage media and/or readable and writeable storage media, such as magnetic disks, solid state drives, magnetic tapes or cassettes, CD-ROMs, CD-RWs, DVDs, or any other medium which can be used to store information and that can be accessed within the computing environment 600.

The computing environment 600 can include input device(s) 670. For example, the input device(s) 670 can provide an input interface to a user of the computing environment 600 and/or to receive inputs from a physical environment. The input device(s) 670 can include a tactile input device (e.g., a keyboard, a mouse, or a touchscreen), a microphone, a camera, a sensor, or another device that provides input to the computing environment 600.

The computing environment 600 can include output device(s) 680. For example, the output device(s) 680 can provide an output interface to a user of the computing environment 600 and/or to generate an output observable in a physical environment. The output device(s) 680 can include a light-emitting diode, a display, a printer, a speaker, a CD-writer, or another device that provides output from the computing environment 600. In some examples, the input device(s) 670 and the output device(s) 680 can be used together to provide a user interface to a user of the computing environment 600.

The computing environment 600 is not intended to suggest limitations as to scope of use or functionality of the technology, as the technology can be implemented in diverse general-purpose and/or special-purpose computing environments. For example, the disclosed technology can be practiced in a local, distributed, and/or network-enabled computing environment. In distributed computing environments, tasks are performed by multiple processing devices. Accordingly, principles and advantages of distributed processing, such as redundancy, parallelization, and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof. As a specific example, a distributed computing environment can include the processing unit 610 and the network-accessible computing environment 690 that is linked through a communications network. In a distributed computing environment, program modules 640 (including executable instructions for offloading cryptographic operations and accessing cryptographic keys stored on a hardware security module) can be located in both local and remote memory storage devices.

The term computer-readable media includes non-transient media for data storage, such as memory 620 and storage 660, and does not include transmission media such as modulated data signals and carrier waves. Any of the disclosed methods can be implemented as computer-executable instructions stored on one or more computer-readable media and executed on a computer (e.g., any commercially available computer). Any of the computer-executable instructions for implementing the disclosed techniques as well as any data structures and data created and used during implementation of the disclosed embodiments can be stored on one or more computer-readable storage media. For example, the computer-executable instructions can be part of a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, or other such network) using one or more network-attached computers.

This disclosure is set forth in the context of representative examples that are not intended to be limiting. Accordingly, this disclosure is directed toward all novel and non-obvious features and aspects of the various disclosed examples, alone and in various combinations and sub-combinations with one another. Many variations of the specific hardware and software used to implement the examples are possible, as will be appreciated by those skilled in the relevant art with the benefit of this disclosure. The disclosed systems, methods, and apparatus are not limited to any specific aspect or feature or combinations thereof, nor does the disclosed technology require that any one or more specific advantages be present or problems be solved. Theories of operation, scientific principles, or other theoretical descriptions presented herein in reference to the disclosed technology have been provided for the purposes of better understanding and are not intended to be limiting in scope. The apparatus and methods in the appended claims are not limited to those apparatus and methods that function in the manner described by such theories of operation.

As used in this application the singular forms "a," "an," and "the" include the plural forms unless the context clearly dictates otherwise. The term "coupled" encompasses mechanical, electrical, magnetic, optical, as well as other practical ways of coupling or linking items together, and does not exclude the presence of intermediate elements between the coupled items. The term "and/or" means any one item or combination of items in the phrase.

The recited order of processing elements or sequences, or the use of numbers, letters, or other designations therefore, is not intended to limit the claimed processes to any order. Although the operations of some of the disclosed methods are described in a particular, sequential order for convenient presentation, it should be understood that this manner of description encompasses rearrangement, unless a particular ordering is required by specific claim language set forth below. For example, operations described sequentially may in some cases be rearranged or performed concurrently. Moreover, for the sake of simplicity, the attached figures may not show all of the various ways in which the disclosed methods can be used in conjunction with other methods.

It should also be well understood that any software functionality described herein can be performed, at least in part, by one or more hardware logic components, instead of software. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Having thus described many possible embodiments to which the principles of the invention may be applied, it will be recognized by those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the scope of the claimed subject matter is defined by the following claims. We therefore claim as our invention all that comes within the scope of these claims.

What is claimed is:

1. A method implemented by a network traffic management system comprising one or more network traffic managers, server devices, or client devices, the method comprising:
   scheduling a deployment of a first software module to execute a first service on a computing node based on an availability of general-purpose computing resources at the computing node, the computing node selected from a cluster of computing nodes, wherein the network traffic manager comprises the cluster of computing nodes;
   analyzing network traffic transiting the computing node during the execution of the first service to determine a hardware accelerator of the computing node is capable of assisting the execution of the first service;
   using the hardware accelerator to assist with the execution of the first service; and
   scheduling a deployment of a second software module to execute a second service on the computing node based on the availability of the general-purpose computing resources and the usage of the hardware accelerator on the computing node.

2. The method of claim 1, further comprising:
   during the execution of the first service on the computing node, transferring execution of a function of the first service from the general-purpose computing resources to the hardware accelerator of the computing node.

3. The method of claim 1, further comprising:
   in response to determining the hardware accelerator of the computing node is capable of assisting the execution of the first service, dynamically reconfiguring hardware of the computing node to implement the hardware accelerator.

4. The method of claim 1, wherein determining the hardware accelerator of the computing node is capable of assisting the execution of the first service comprises determining that the first service will process network traffic at an increased rate using the hardware accelerator than by using only the general-purpose computing resources of the computing node.

5. The method of claim 1, wherein analyzing the network traffic transiting the computing node comprises determining a type of network traffic processed by the first service.

6. The method of claim 1, wherein analyzing the network traffic transiting the computing node comprises determining a relative proportion of the network traffic processed by the first service compared to other services executing on the computing node.

7. The method of claim 1, further comprising:
   detecting a change in a proportion of network traffic processed by the first service to network traffic processed by the second service; and
   in response to detecting the change, dynamically reconfiguring the computing node to replace the hardware accelerator assisting the execution of the first service with a different hardware accelerator that assists the second service.

8. A system comprising one or more network traffic manager modules, networking modules, or server modules, memory comprising programmed instructions stored thereon, and one or more processors configured to be capable of executing the stored programmed instructions to:
   schedule a deployment of a first software module to execute a first service on a computing node based on an availability of general-purpose computing resources at the computing node, the computing node selected from a cluster of computing nodes, wherein the network traffic manager module comprises the cluster of computing nodes;
   analyze network traffic transiting the computing node during the execution of the first service to determine a hardware accelerator of the computing node is capable of assisting the execution of the first service;
   use the hardware accelerator to assist with the execution of the first service; and
   schedule a deployment of a second software module to execute a second service on the computing node based on the availability of the general-purpose computing resources and the usage of the hardware accelerator on the computing node.

9. The system of claim 8, wherein analyzing the network traffic transiting the computing node comprises determining a type of network traffic processed by the first service.

10. The system of claim 8, wherein the one or more processors are further configured to be capable of executing the stored programmed instructions to:
    during the execution of the first service on the computing node, transfer execution of a function of the first service from the general-purpose computing resources to the hardware accelerator of the computing node.

11. The system of claim 8, wherein the one or more processors are further configured to be capable of executing the stored programmed instructions to:
    in response to determining the hardware accelerator of the computing node is capable of assisting the execution of the first service, dynamically reconfigure hardware of the computing node to implement the hardware accelerator.

12. The system of claim 8, wherein determining the hardware accelerator of the computing node is capable of assisting the execution of the first service comprises determining that the first service will process network traffic at an increased rate using the hardware accelerator than by using only the general-purpose computing resources of the computing node.

13. The system of claim 8, wherein analyzing the network traffic transiting the computing node comprises determining a relative proportion of the network traffic processed by the first service compared to other services executing on the computing node.

14. A non-transitory computer readable medium of a network traffic manager having stored thereon instructions comprising executable code that, when executed by one or more processors, causes the processors to:
- schedule a deployment of a first software module to execute a first service on a computing node based on an availability of general-purpose computing resources at the computing node, the computing node selected from a cluster of computing nodes, wherein the network traffic manager comprises the cluster of computing nodes;
- analyze network traffic transiting the computing node during the execution of the first service to determine a hardware accelerator of the computing node is capable of assisting the execution of the first service;
- use the hardware accelerator to assist with the execution of the first service; and
- schedule a deployment of a second software module to execute a second service on the computing node based on the availability of the general-purpose computing resources and the usage of the hardware accelerator on the computing node.

15. The non-transitory computer readable medium of claim 14, wherein the instructions further comprise executable code that, when executed by one or more processors, causes the processors to:
- during the execution of the first service on the computing node, transfer execution of a function of the first service from the general-purpose computing resources to the hardware accelerator of the computing node.

16. The non-transitory computer readable medium of claim 14, wherein the instructions further comprise executable code that, when executed by one or more processors, causes the processors to:
- in response to determining the hardware accelerator of the computing node is capable of assisting the execution of the first service, dynamically reconfigure hardware of the computing node to implement the hardware accelerator.

17. The non-transitory computer readable medium of claim 14, wherein the instructions further comprise executable code that, when executed by one or more processors, causes the processors to:
- detect a change in a proportion of network traffic processed by the first service to network traffic processed by the second service; and
- in response to detecting the change, dynamically reconfigure the computing node to replace the hardware accelerator assisting the execution of the first service with a different hardware accelerator that assists the second service.

18. A network traffic manager, comprising memory comprising programmed instructions stored thereon and one or more processors configured to be capable of executing the stored programmed instructions to:
- schedule a deployment of a first software module to execute a first service on a computing node based on an availability of general-purpose computing resources at the computing node, the computing node selected from a cluster of computing nodes, wherein the network traffic manager comprises the cluster of computing nodes;
- analyze network traffic transiting the computing node during the execution of the first service to determine a hardware accelerator of the computing node is capable of assisting the execution of the first service;
- use the hardware accelerator to assist with the execution of the first service; and
- schedule a deployment of a second software module to execute a second service on the computing node based on the availability of the general-purpose computing resources and the usage of the hardware accelerator on the computing node.

19. The network traffic management apparatus of claim 18, wherein the one or more processors are further configured to be capable of executing the stored programmed instructions to:
- during the execution of the first service on the computing node, transfer execution of a function of the first service from the general-purpose computing resources to the hardware accelerator of the computing node.

20. The network traffic management apparatus of claim 18, wherein the one or more processors are further configured to be capable of executing the stored programmed instructions to:
- in response to determining the hardware accelerator of the computing node is capable of assisting the execution of the first service, dynamically reconfigure hardware of the computing node to implement the hardware accelerator.

* * * * *